SEMICONDUCTOR DEVICES

Filed May 28, 1963

INVENTORS
TERUO HAYASHI
SHIGERU TSUJI
SHINZO ANAZAWA
BY
Hopgood & Calimafde
ATTORNEYS

United States Patent Office 3,264,712

Patented August 9, 1966

3,264,712

SEMICONDUCTOR DEVICES

Teruo Hayashi, Shigeru Tsuji, and Shinzo Anazawa, Tokyo, Japan, assignors to Nippon Electric Company Limited, Tokyo, Japan, a corporation of Japan Filed May 28, 1963, Ser. No. 283,856
Claims priority, application Japan, June 4, 1962, 37/23,065
2 Claims. (Cl. 29—155.5)

This invention relates to semiconductor devices and to a method of manufacturing and hermetically sealing semiconductor devices.

As shown in FIG. 1 of the attached drawings, in the prior art, the semiconductor element 6 of a diode or transistor is mounted on a stem comprising a metallic tray 1 and lead wires 3, 4 and 5 insulated therefrom by means of an insulator 2 such as glass, with the provision of internal leads 7 and 8, and a cap 9 fitted and sealed at 10 by means of electric welding or soldering.

According to the present invention, however, the semiconductor element is mounted on a support plate shaped from a thin metallic sheet, and after the semiconductor element is coated with glass, the assembled unit is severed from the support plate. This results in many advantages over previous devices in that it is simple in construction, small in size, and of low cost in its manufacture.

Other objects and advantages of the invention will be apparent to those skilled in the art from the following description of several specific embodiments thereof, as illustrated in the attached drawings, in which.

Figure 1:
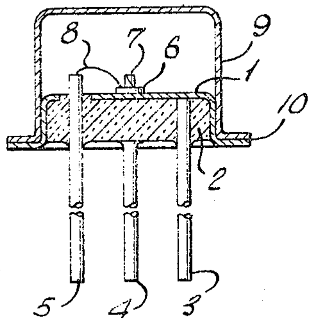
Fig. 1. PRIOR ART
FIG. 1 is an elevation section of a prior art semiconductor device.
Figure 2A:
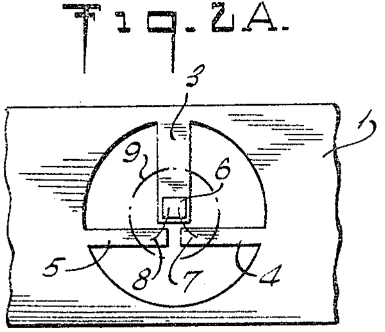
FIG. 2A is a plan view of one embodiment of the invention.
Figure 2B:
FIG. 2B is an elevation section of the embodiment shown in FIG. 2A.

FIGS. 2A and 2B show a plan assembly view and its sectional elevation of a mesa or planar type transistor of the present invention. Support plate 1 with extensions 3, 4 and 5 is shaped out from a thin metallic sheet of gold, platinum, copper, iron nickel alloy, iron-nickel-chrome alloy, or the like.

On the end portion of the collector extension 3 is mounted a mesa transistor element 6, to which the internal leads 7 and 8 from the emitter and base extensions 5 and 4 are connected. Low melting point glass, comprising for example, $$PbO—B_2O_3—SiO_2—Al_2O_3$$
$$PbO—B_2O_3—GeO_2—SiO_2—Sb_2O_3$$
$$Pb—B_2O_3—ZnO$$

or any combination of these, as may be softened and fluidified below 400° C. or 500° C., for example, to be well adhesive and to form a hermetic seal is finely powdered and suspended in a binder liquid comprising, for example, ethyl alcohol, and is applied over the whole of the semiconductor element assembly, dried, and then melted by heating to form a hermetic seal.

In the above process, the mesa or planar type silicon transistor will not be deteriorated in its characteristics nor damaged even when it is heated to more than 400° C. to melt the glass, and also the internal connecting leads 7, 8 will be strengthened against mechanical vibration because they are fixed by the glass. Finally each extension 3, 4, 5 is cut off from the support plate 1 to any desired length thus to complete a semiconductor device. The broken line in FIG. 2A and 9 in FIG. 2B indicate the glass hermetic seal.

Figure 3A:
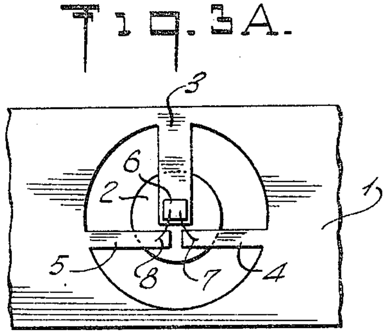
FIG. 3A is a plan view of another embodiment of the invention.
Figure 3B:
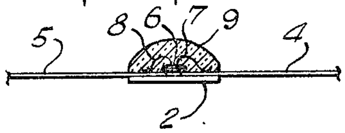
FIG. 3B is an elevation section of the embodiment shown in FIG. 3A.

FIGS. 3A and 3B show the plan and sectional elevation views of another embodiment of the mesa type transistor in accordance with the present invention similar to that in FIG. 2. As described previously, the support plate 1 is shaped from a thin metallic sheet or tape and provided with extensions 3, 4, 5. Semiconductor element 6 is mounted thereon and internal leads 7 and 8 are connected thereto. The support plate thus prepared is put on an insulating plate 2 of ceramic, for example, and its upper side is coated, as stated before, with a suspension comprising the binder liquid and the low melting point glass powder, and the assembled unit is heated to melt the glass to form a glass hermetic seal 9. The extensions 3, 4 and 5 are then severed from the support plate 1 to complete a semiconductor device.

From the foregoing description it will be apparent that this invention provides a semiconductor device which is simple in construction, economical in cost, small in size and adapted to be manufactured in an automated continuous process, and strong against mechanical vibration as compared with the previous semiconductor devices with sealed semiconductor elements.

Although description has been made of particular embodiments of the invention, it will be understood that the invention will be equally applicable to other types of semiconductor devices with sealed semiconductor elements within the spirit and scope of this invention.

What is claimed is:

1. A method of manufacturing semiconductor devices comprising the steps of (A) forming in a flat piece of conductive material an opening having inwardly projecting extensions, (B) attaching a semiconductor element between said inwardly projecting extensions in such manner that the inwardly projecting extensions form lead elements for said semiconductor device, (C) encapsulating said semiconductor element and the innermost portions of said inwardly projecting extensions with an encapsulating material containing powdered glass having a melting temperature below 500° C., said encapsulating step comprising applying a coating of said encapsulating material to said semiconductor element and the innermost portions of said inwardly projecting extensions, then heating the coated semiconductor element to a temperature between 500° C. and said melting temperature to melt said powdered glass, and then cooling the semiconductor element to solidify said melted glass and thus encapsulate said semiconductor element in a glass envelope, and (D) cutting said inwardly projecting extensions free of said piece of conductive material to form an encapsulated semiconductor device, wherein said extensions protrude outwardly from said glass envelope and serve as said lead elements for said device.

2. A method of manufacturing a transistor comprising the steps of (A) forming in a flat piece of conductive material an opening having three inwardly projecting extensions, (B) attaching a semiconductor transistor element between said inwardly projecting extensions in such manner that one extension forms a base lead element, another a collector lead element, and another an emitter lead element, (C) encapsulating said semiconductor element and the innermost portions of said inwardly projecting extensions with an encapsulating material containing powdered glass having a melting temperature below 500° C., said encapsulating step comprising applying a coating of said encapsulating material to said semiconductor element and the innermost portions of said inwardly projecting extensions, then heating the coated semiconductor element to a temperature between 500° C. and said melting temperature to melt said powdered glass, and then cooling the semiconductor element to solidify said melted glass and thus encapsulate said semiconductor element in a glass envelope, and (D) cutting said inwardly projecting extensions free of said piece of conductive material to form an encapsulated transistor, wherein said extensions protrude outwardly from said glass envelope and serve as said base, collector and emitter lead elements for said transistor.

References Cited by the Examiner

UNITED STATES PATENTS

| | | | |
|---|---|---|---|
| 2,744,308 | 5/1956 | Loman | 29—25.3 |
| 3,048,914 | 8/1962 | Kohring | 29—155.63 |
| 3,065,525 | 11/1962 | Ingraham et al. | 29—155.55 |
| 3,115,697 | 12/1963 | Shaver et al. | 29—155.5 |

JOHN F. CAMPBELL, *Primary Examiner.*

WHITMORE A. WILTZ, *Examiner.*

J. W. BOCK, W. I. BROOKS, *Assistant Examiners.*